UNITED STATES PATENT OFFICE.

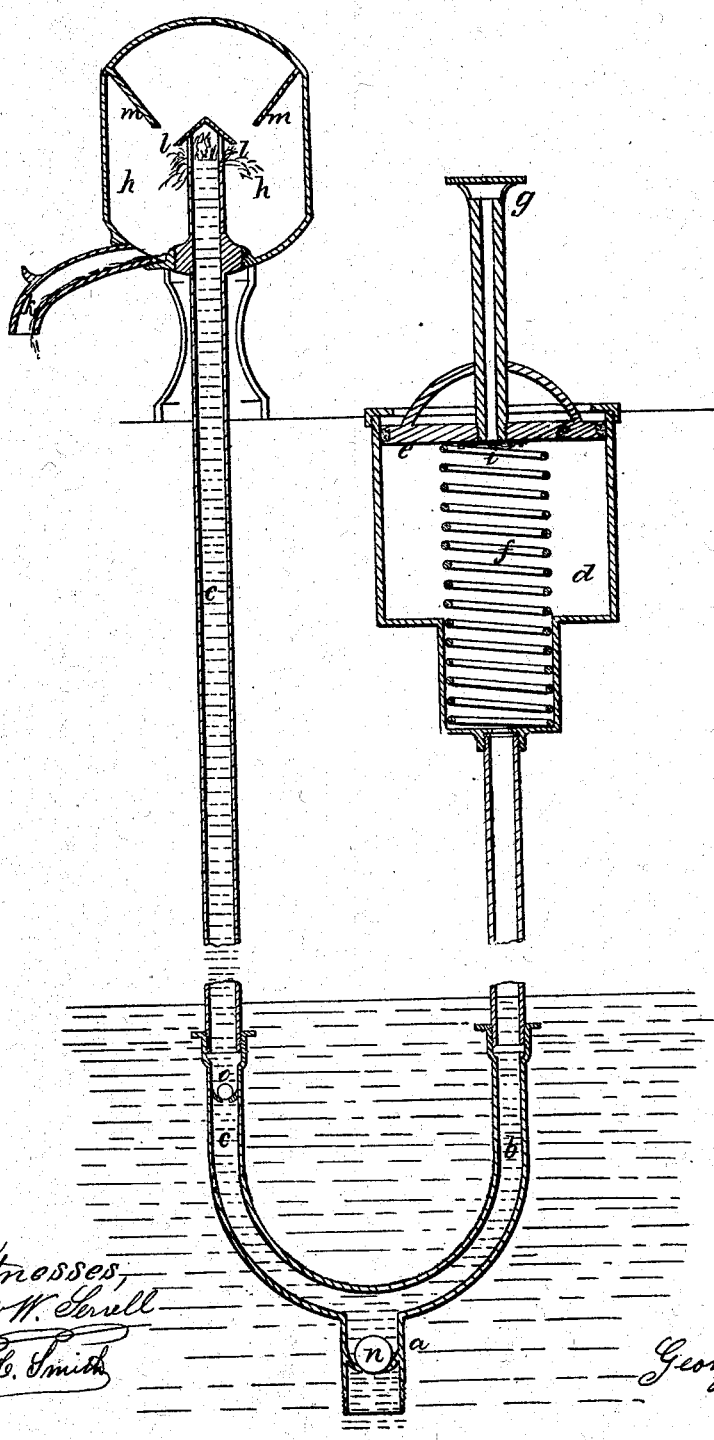

GEORGE W. MARTIN, OF MORRISANIA, NEW YORK, ASSIGNOR TO HIMSELF, AND WM. SHEPPARD, OF TREMONT, NEW YORK.

PUMP.

Specification for Letters Patent No. 32,030, dated April 9, 1861.

*To all whom it may concern:*

Be it known that I, GEORGE W. MARTIN, of Morrisania, in the county of Westchester and State of New York, have invented, made, and applied to use a certain new and useful Improvement in Pumps, which I denominate "Martin's novelty pump;" and I do hereby declare that the following is a full, clear, and exact description of the construction and operation of the same, reference being had to the annexed drawing, making part of this specification, wherein I have represented a vertical section of my said pump.

The nature of my said invention consists in the combination of a vessel in which air is compressed with pipes and valves arranged in such a manner that upon compressing the air in said cylinder the water will be forced up and discharged, and then upon allowing the air to expand by the movement of the apparatus the water will again run or be drawn into said pipes.

In the drawing $a$, is a pipe introduced below the surface of the water and provided with two branches $b$, and $c$. The branch $b$, extends to the air cylinder $d$, in which is the piston $e$, kept up by the spring $f$. $g$ is a handle or foot piece rising above the said cylinder from the piston $e$, and $i$, is a valve of any suitable character opening inward. The stem of the handle or foot piece $g$ may be hollow and the valve at the lower end; or openings of any desired character may be provided to allow for the passage of air to the valve. The other branch $c$, extends up and terminates in the reservoir $h$, from which a pipe or nozzle $k$, delivers the water. The upper end of this reservoir is open, and the deflectors $l$, $m$, are provided to prevent the water being thrown out of said reservoir as forced up the pipe $c$.

$n$, is a valve at the end of the pipe $a$, and $o$, is a valve in the pipe $c$.

The operation is as follows: Upon the apparatus assuming a normal position the water rises past the valve $n$, to its level within the pipes $a$, $b$ and $c$, and upon the foot or other power being applied to the piston $e$, the air is compressed in the cylinder $d$, and pipe $b$, and the water is forced up past the valve $o$, in the pipe $c$; and by releasing the pressure of the foot, the spring $f$, throws up the piston $e$, the pipe $b$, again partially fills with water by the suction and the operation is repeated the water being thrown up into the reservoir $h$, and running away by the spout $k$. If the air in the cylinder $d$, becomes wasted the valve $i$, admits more.

The extent and rapidity of action in raising the water will depend upon the size of the pipe $b$, and capacity of the cylinder $d$.

What I claim and desire to secure by Letters Patent is:

The pipes $b$, and $c$, valves $n$ and $o$, arranged as specified, in combination with the air vessel $d$ and piston $e$ for the purposes and as set forth—and in combination therewith I claim the arrangement of the deflectors $l$, and $m$, in the reservoir $h$ for the purposes specified.

In witness whereof I have hereunto set my signature this thirty-first day of January 1861.

GEORGE W. MARTIN.

Witnesses:
LEMUEL W. SERRELL,
CHAS. H. SMITH.